Figure 3:
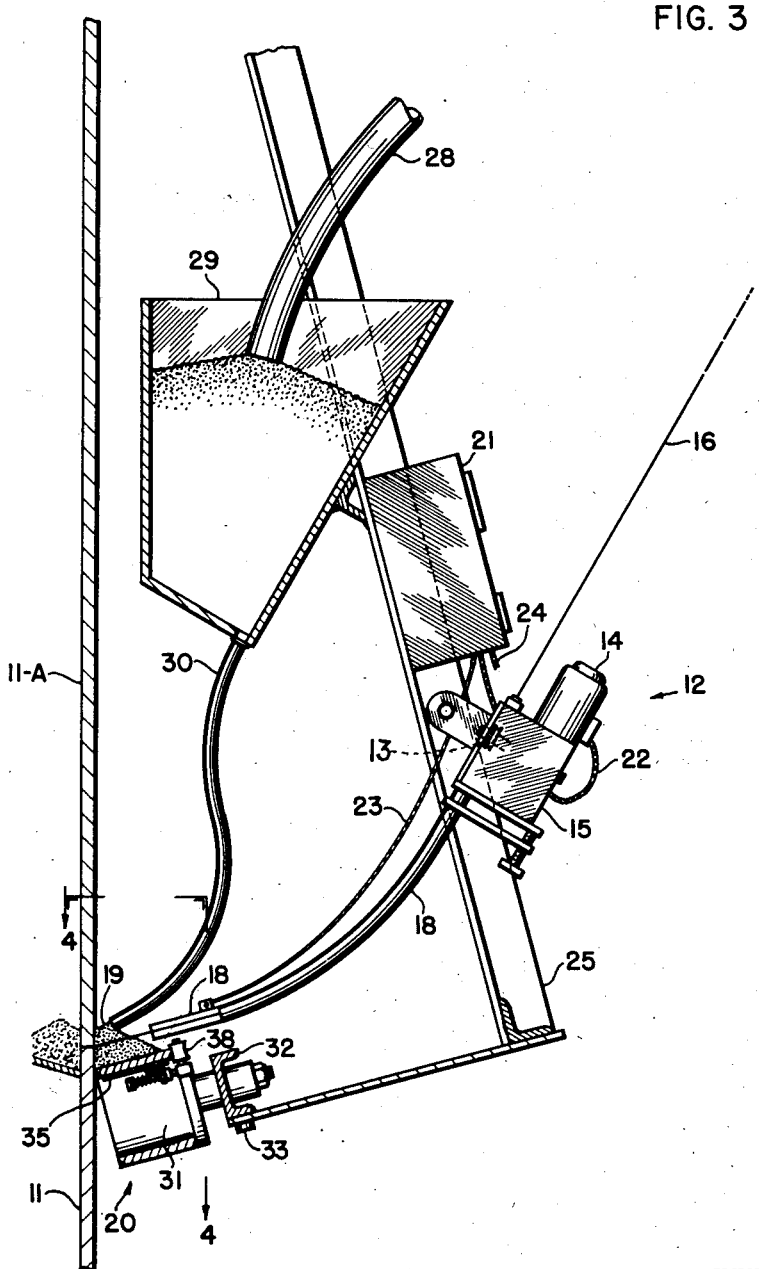

May 12, 1953     A. R. MEYER     2,638,524
WELDING PROCESS AND APPARATUS
Filed Oct. 24, 1951     5 Sheets-Sheet 1
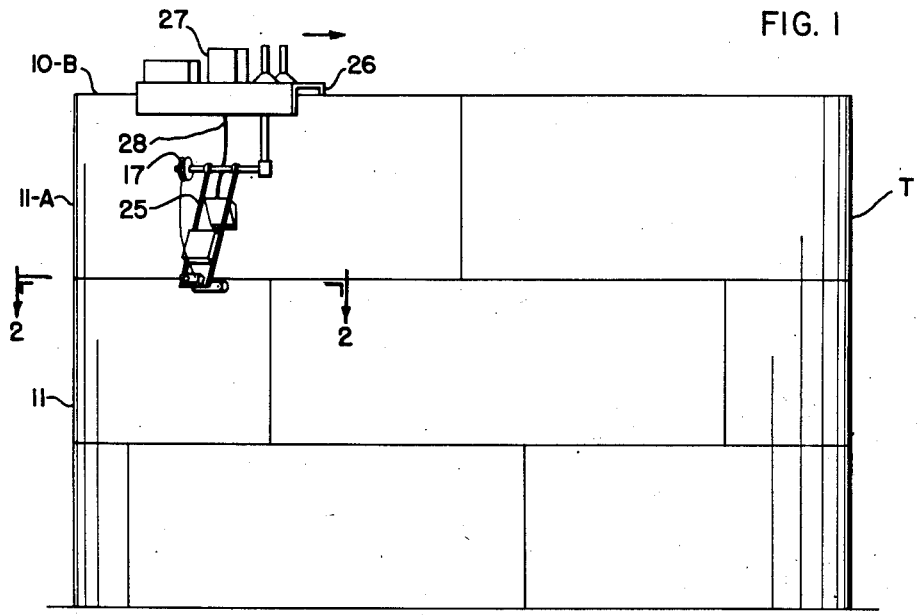
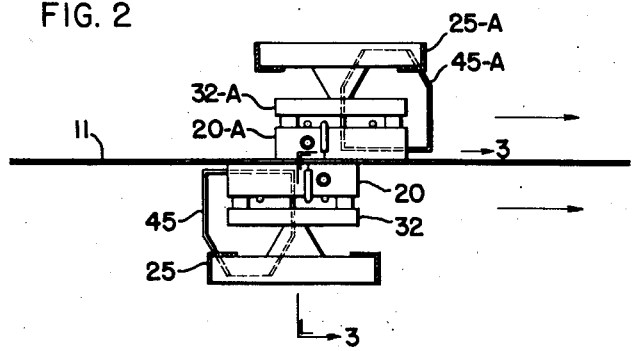
INVENTOR:
Amel R. Meyer
BY
F. O. Prager
Atty.

May 12, 1953 — A. R. MEYER — 2,638,524
WELDING PROCESS AND APPARATUS
Filed Oct. 24, 1951 — 5 Sheets-Sheet 2

INVENTOR:
Arnel R. Meyer
BY
F. O. Prager
Atty.

May 12, 1953        A. R. MEYER        2,638,524

WELDING PROCESS AND APPARATUS

Filed Oct. 24, 1951        5 Sheets—Sheet 4

INVENTOR:
Amel R. Meyer
BY
F. D. Draper
Atty.

May 12, 1953 — A. R. MEYER — 2,638,524
WELDING PROCESS AND APPARATUS
Filed Oct. 24, 1951 — 5 Sheets-Sheet 5

INVENTOR:
Amel R. Meyer
BY F. D. Rogers
Atty.

Patented May 12, 1953

2,638,524

UNITED STATES PATENT OFFICE 2,638,524

WELDING PROCESS AND APPARATUS

Amel R. Meyer, Griffith, Ind., assignor to Graver Tank & Mfg. Co., Inc., East Chicago, Ind., a corporation of Delaware Application October 24, 1951, Serial No. 252,919

12 Claims. (Cl. 219—8)

This invention relates to field-welded tank shells with vertical, cylindrically or differently curved plates, joined by continuous, homogeneous, horizontal weld seams. These weld seams are formed with a new variant of submerged arc welding.

Heretofore, submerged arc welding with long, bare electrode wires operating in a bed of granulated or powdered flux, has been used on work piece surfaces lying in flat position and supporting all or most of the flux. It was successful mainly in automatic shop work. In work on stationary, upright shells as encountered mainly in field construction it has been obvious for several years that flux and molten materials must be supported by some auxiliary mechanism, but no satisfactory support was available.

I discovered the fact that particular difficulty was due even to relatively minor disturbance of the flux bed, caused by the escape of flux particles between a curved shell and a straight-edged support. I invented a mechanism which eliminates such disturbance while providing required and favorable conditions in the various other respects to be kept in mind. With this mechanism I have formed continuous, homogeneous, horizontal weld seams in stationary, vertical, cylindrical shells—for the first time, so far as I know.

The mechanism uses a portable or movable, flexible flux support strip, provided by an endless band or the like. The support strip is held parallel to and slightly below a stationary, horizontal welding zone, preferably in flat position. It is moved slight distances laterally and pressed against the rigid, curved shell, thereby forming a kind of shallow trough with a flat, tightly fitted bottom. Granulated or powdered flux is then poured into this trough, in sufficient amount to form a flux bed covering the welding zone, and a welding arc is traversed along that zone, submerged under the flux bed.

Without the expedient of pressing the strip against the shell and thereby forming a tight trough, the flux bed is seriously disturbed by downward escape of flux particles, and the resulting weld seam, if any, is inferior. With the expedient mentioned this defect is avoided and an adequate weld seam can be formed.

The disturbance mentioned can be explained briefly as follows. The formation of an adequate seam depends on a proper interplay of gravity and surface tension at the interface of molten and freezing metal and freezing and frozen slag. This surface tension in turn depends in part on surface tension in outer, cooler layers of freezing and frozen slag. The different surface conditions are the result of molecular forces, affected by the temperatures in the different layers. They are also affected by mechanical factors, such as disturbance of the flux or slag layer contacting the metal, due to gravitational escape of adjacent flux particles. In other words, the condition and ultimate form of the different layers and their interfaces depends largely on the tightness of the trough or support mechanism for the flux bed.

By means of the tight trough, mechanically formed in accordance herewith, it is physically possible to form the different flux layers into a mold which holds the molten metal so as to form a satisfactory weld bead. This physical process can be aided by suitable selection of various factors such as welding temperature, current density, etc. but it depends mainly on the mechanical conditions as mentioned.

The equipment which affords these mechanical conditions can travel around a stationary tank shell, constantly adding to the front end of the stationary flux bed and removing rear end portions therefrom, while traversing the welding electrode through the stationary part of the flux bed. The mechanical and physical details will be understood more clearly upon consideration of the detailed descrption which follows.

Figure 4:
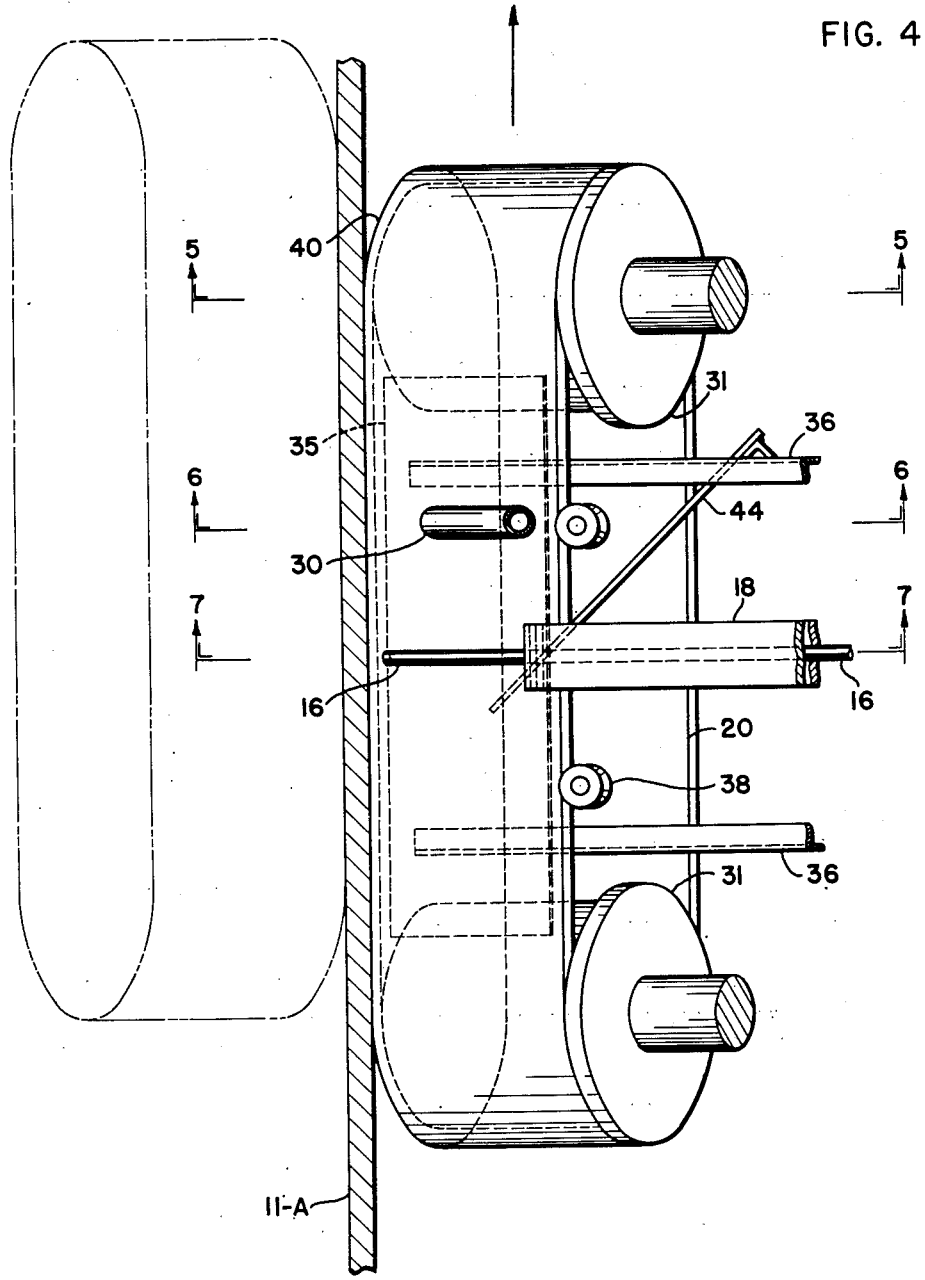
Figure 5:
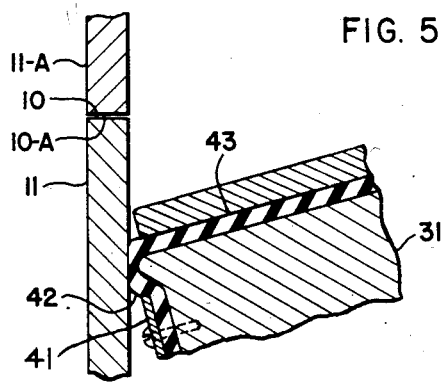
Figure 6:
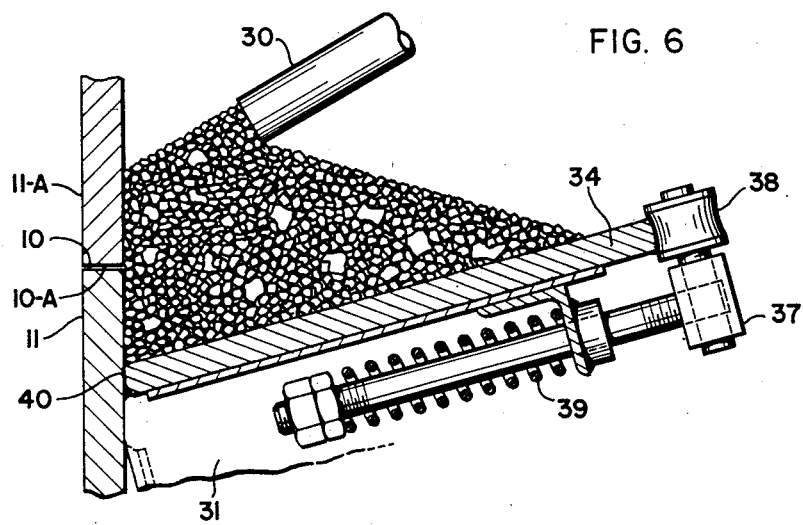
Figure 7:
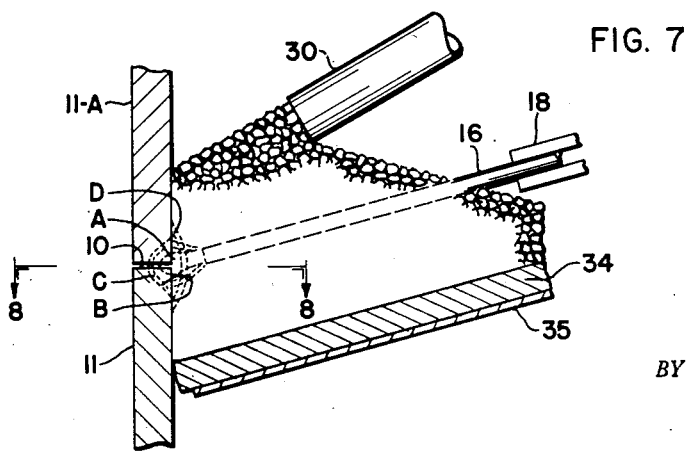
Figure 8:
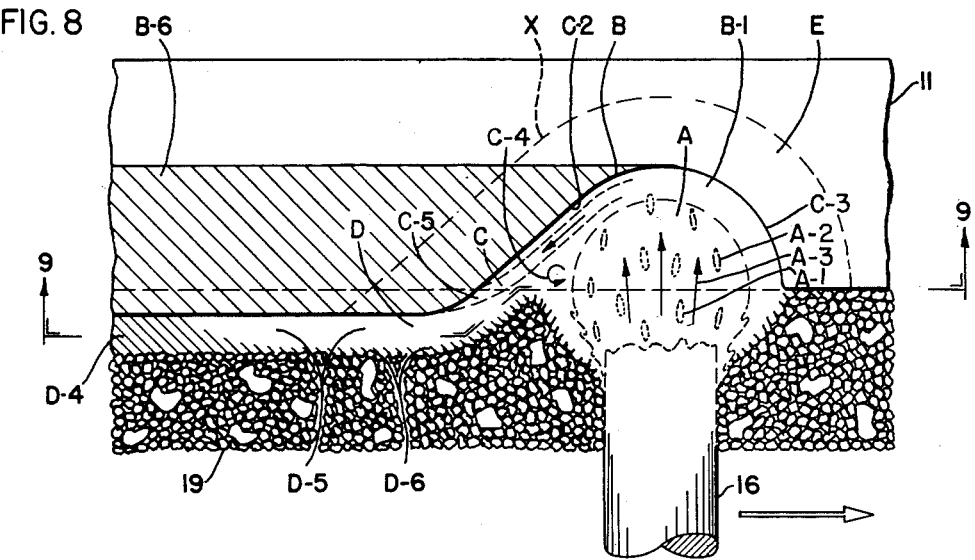
Figure 9:
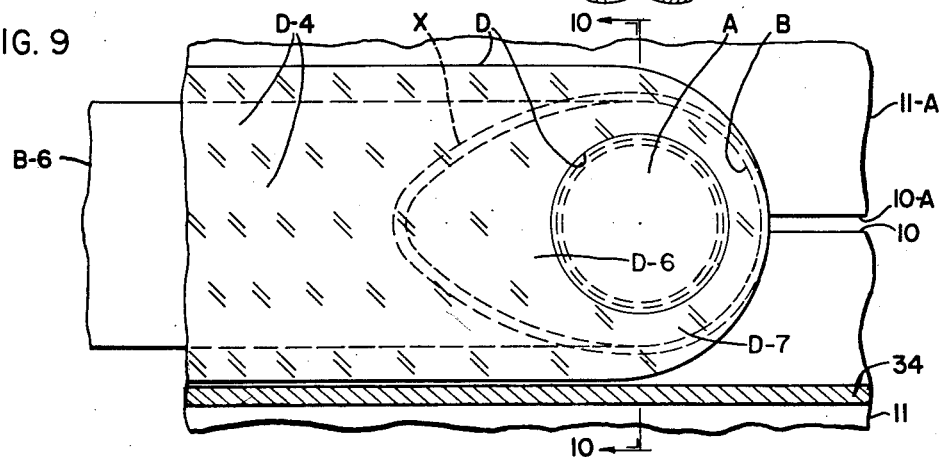
Figure 10:
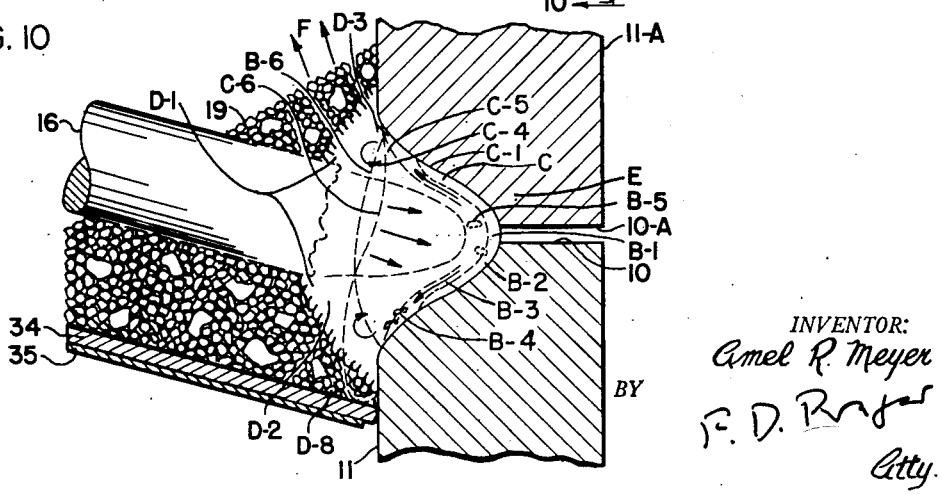

In the drawing Fig. 1 is an elevation of a tank under construction in accordance herewith. Fig. 2 is a partial sectional plan view of the tank, on a somewhat larger scale taken along lines 2—2 in Fig. 1. Fig. 3 is a sectional elevation, taken along lines 3—3 in Fig. 2, on a more enlarged scale. Fig. 4 is a sectional plan view on a scale more enlarged than Fig. 3, taken along lines 4—4 in Fig. 3. Figs. 5 to 7 are sectional elevations, taken along the respective lines in Fig. 4 and being on the same scale with Fig. 4. Figs. 8 to 10 are sectional views on a still larger scale, taken along the respective lines in Figs. 7, 8 and 9 respectively.

A pair of horizontally elongated plate edges 10, 10A are to be joined, between vertical plates 11, 11A, forming part of the shell of the tank T under construction. The tanks are usually cylindrical and accordingly the plates have a slight, regular curvature, impressed thereon by well-known shop or field procedures. Different radii of such curvature are used, depending on the size of the tank under construction. Sometimes the plates have irregular curvatures, due to distortion caused in fabrication, shipment or field-work. Frequently the plates have curvatures of both types, regular and irregular.

The new device uses a welding head 12, comprising a pair of rollers 13 driven by a motor 14 through a speed reducer 15. The rollers feed a bare metal electrode wire 16 from a reel 17 through a guiding nozzle 18 into a bed or layer 19 of granular or powdered flux, covering the edge 10, 10A and surrounding plate areas. The flux, usually a silicate material, rests on a flexible conveyor belt 20. Welding current is supplied to the bare metal of the electrode through the nozzle 18, under the control of instruments mounted in a box 21. This box contains also the instruments for the control of the motor 14. It is connected to said motor by conductors 22, to the electrode nozzle by conductors 23 and to the shell plates by conductors 24. The welding head, nozzles, instrument box and flux belt are mounted on suitable parts of a chassis 25, shown as suspended from a carriage 26 travelling on the horizontal top edge 10B of the upper plates 11A. The flux is poured onto the belt 20 from a supply 27 on the carriage 26, by a hose 28 which discharges by gravity through a hopper 29 having a guiding discharge spout 30. The hopper and spout are preferably mounted on the suspended chassis 25.

The ends of the conveyor belt 20 are held at a predetermined distance from one another, by two rollers 31, mounted at the two ends of a horizontal structure or sub-frame 32. The sub-frame is pivoted to the chassis 25 at 33, so that the sub-frame and conveyor assembly can swing in an approximately horizontal plane thereby adapting itself to the shell and presenting the working surface of the flux belt to the shell in uniform manner at both ends.

An upper substantially horizontal surface portion or run 34 of the belt extends along and slightly below the horizontal edges 10, 10A. It is more or less flat transversely of the shell, in order to give suitable access to the electrode 16. The upper run 34 of the flexible, endless belt is supported by an underlying, rigid member or tray 35 mounted on the sub-frame 32 by arms 36.

I further provide brackets 37, shown as supported by the tray 35 and supporting rollers 38. These rollers engage the free edge of the upper belt run 34. Springs 39 urge the brackets 37 and rollers 38 toward the plate 11, whereby the rollers 38 shift the body of the upper belt run 34 in its own flat plane laterally toward the said plate 11. Accordingly the working edge 40 of this upper, flexible belt run contacts the curved rigid steel plate 11 with pressure. A tight seal is thus effected in the contact area between the belt and plate, and temporarily a tight, leakproof trough 11, 34 is formed, for the flux bed 19. This is impossible with a rigid tray alone and also with a flexible belt alone.

No serious warping or buckling of the flexible belt is encoutered upon said lateral flexing or shifting and pressing, even with belts of desirable flexibility for such shifting. This is achieved by the support tray 35. It is facilitated by making the lateral distance involved in the shifting of the belt relatively small, in comparison with the length of the flux belt. In other words, the flux-supporting belt and tray combination is limber in a horizontal plane, rigid in vertical planes, and biased to be and remain in close contact with the wall.

As the welding head 12 and associated devices travel along the shell, new portions of the flux belt must be added to those in contact with the wall, at the front, and corresponding portions removed in the rear. This is preferably done by forming the outer parts of the inclined end surfaces 41 into annular beads 42, on the belt rollers 31 (Fig. 5), so as to provide considerable traction; greater traction than exists at the belt edge 40. Rubber rings and sleeves are shown as providing belt roller surfaces 42 and 43 respectively; the surface 43 being in contact with the inner surface of the belt 20. The top of each end surface 41 is pressed against the wall 11 with relatively high pressure, for instance by swingingly suspending the chassis 25, and thereby also the sub-frame 32, so that it tends to move toward the plates and stopping such motion by the rollers 31. The resulting pressure on the end surfaces of the two rollers is equalized by the pivoted support 33 of the sub-frame 32 (Figs. 1 and 3).

Uniform traction and roller rotation is thus obtained and transmitted to the belt, by uniform travel of the carriage 26. The uniform travel of the belt edge 40 relative to the sub-frame 32, obtained by the rollers, is substantially as fast as the travel of this sub-frame relative to the shell, and proceeds in the opposite direction. As a result, the relative motion of all belt portions is uniform; the working run 34 of the belt 20 is held in a practically stationary position with respect to the tank wall; the working run of the belt slides relative to the supporting tray 35 at the approximately velocity at which the supporting frame etc. move, but in the opposite direction; and the lower run of the belt 20 moves in the direction of the frame, at twice the speed thereof, adding successive portions of the endless belt to the working run. No other belt drive is required.

Depending on whether the present device is used inside or outside of the shell, that is, on the concave or convex side, it may be desirable to make adjustments in the pressure of springs 39 actuating the brackets of the lateral rollers 38, and in the relative position of the tray and drive rollers. However, when the shell curvature has a long radius and the welding zone is relatively short, little or no adjustment is required in the rigid parts of the device. Two guide rollers 38, as shown, are often sufficient; but of course modifications may be desirable.

Flux particles should be prevented from interfering with the free movement of the belt 20 over the driver roller 31. For this purpose a scraper 44 may be secured to the underside of the tray 35, with a scraping edge adapted to remove intercepted particles from the upper surface of the forward moving, lower belt run, ahead of the leading drive roller (Fig. 4).

The movable but tight-fitting upper belt run 34, together with the stationary shell plates, provides the trough or form for the undisturbed, effective flux or slag mold for the molten metal. This applies, primarily, on one side of the shell, where the weld zone and welding equipment as shown is slightly ahead of the other side. A similar trough is provided on said other side; it can be utilized, first to provide a flux backing for the leading unit (comparable in some respects with the flux backing of J. M. Keir's Patent 2,145,009 and G. D. Bagley's Patent 2,294,439); and it can then be used as a mold form for the melt produced by the trailing unit.

It is also possible to arrange two arcs on opposite sides of the shell, so closely together as to form a single, joint, interfused weld bead, preferably "confined" between "juxtaposed" plate edges (as proposed in V. Peters' Patent 2,529,812). In that event the backing effect of either flux bed may be insignificant, but the necessity for a tight mold form on each side is just as great as otherwise. (I have found it impossible to carry out the proposals of Peters without such a mold form, at least in field construction work on stationary, vertical, cylindrical tank shells.)

The preferred materials used in the present process are as follows. Mild steel plates are usually involved. The edge preparation thereon can be substantially the same as in the manual arc welding of vertical plates with flux-coated electrodes; that is: a normal butt joint is formed; a square edge is always used on the lower plate and a square or bevelled edge on the upper plate. In some respects I prefer features different from manual routine on vertical plates. For instance: the groove or clearance between the plate edges is preferably made as narrow as possible, regardless of plate thickness; and electrodes used are not only continuous and uncoated but also rather uniformly thin regardless of plate thickness. Welding currents used are correspondingly dense. The electrode thickness and current density are also different from those used in comparable, flat, submerged arc welding. The fluxes used can be those known from shop practice, that is silicates of calcium, manganese or equivalents thereof, with or without other materials added, and with or without special features of preparation and resulting constitution. The flux generally has a higher range of melting temperatures than do the metals involved. It is a relatively poor conductor of heat.

A concept of great importance for the new process is that of the welding zone. This zone, as mentioned, covers a certain length of the plate edges to be joined. The length involved depends on the duration of the welding cycle, that is, on the time interval between the start of melting and the completion of freezing at any point. This time interval is a function of numerous factors; and some of these, including size of electrode and traversing speed, are preferably somewhat special herein.

When these interrelated considerations are given proper weight and effect it will generally be found that the required flux trough, below the welding zone, has an approximate length up to about six or eight inches, so long as the thickness of the shell plates to be welded ranges up to about one or one and a half inches. Typical shell radii are in a range of fifteen to a hundred and fifty feet. The difficulty encountered in former attempts at submerged welding of vertical shells, when analyzed in the light of the present invention, was connected with the crack formed between a curved rigid shell and a straight edged tray or belt, having typical dimensions as indicated. Such a crack seems minute in comparison with the dimensions of the tank or even with those of the required flux trough. However, it often equals many times the diameter of a typical flux particle. It is for this reason that the safe elimination of such a seemingly minute crack, between the belt and plate, is important. I have discovered the fact that a significant amount of flux tends to escape, within the normal welding cycle, seriously disturbing the formation of a proper weld bead.

Any attempt to hold the flux against such escape, by pressure on the flux rather than on the belt would aggravate the situation; it would lead to the irregular escape of large masses of flux. Any attempt to resupply the escaping flux would aggravate the situation in a different manner; it would lead to a permanently disturbed flux bed.

The new process will be understood more thoroughly upon further analysis of the welding zone. There is no complete unanimity about the scientific nature of such a zone, but it may be helpful for a practical understanding of the present invention to visualize the present welding zone (Figs. 8, 9, 10) as the body of metal, flux, etc., confined within one of the welding isotherms; for instance in the case of mild steel with 0.2% carbon, the 1490 degree centigrade isotherm X. It can probably be assumed that basically an arc column A, crater B and melt flow zone C form parts of this welding zone and that these parts are generally similar to the corresponding parts of earlier submerged arc welding processes except as noted herein. It can be concluded, and to some extent observed, that the new process involves, as a fourth major part of the welding zone a layer of slag which is formed, supported and utilized in a partly novel manner.

The manner in which the basic arc column A, crater B and melt flow C are formed is fairly well known to the art although not fully understood. The arc column A consists largely of an incandescent hot mixture of liquid metal globules A-1, liquid flux particles A-2, and ionized gases and vapors therebetween. The entire fluid mass moves rapidly, as an arc blast A-3, in the general direction from the tip of the electrode 16 to the apex B-1 of the crater B. This apex is largely filled with a mixture of mushy metal B-2, liquid metal B-3, liquid flux B-4 and gas bubbles B-5. There is created and maintained a melt flow or wave C, progressing along the hot side walls C-1 and the even hotter rear wall C-2 but generally not along the relatively cooler front wall C-3 of the crater B; the designations "front" and "rear" referring to the direction of electrode travel. As the melt flow proceeds fairly rapidly, counter-currently to the arc blast, and through a somewhat limited part of the crater, it is turbulent and causes intimate contact between the different constituents of the flow. This contact in turn causes chemical purification of the molten metal by the flux, as well as mechanical coalescence or mutual ejection of molten metals and lighter constituents. Ejection of flux or slag is promoted by the relatively rapid freezing thereof. Separation of the constituents takes place progressively in the melt flow C; perhaps with the aid of centrifugal forces in vortex zones C-4 forming part of the flow.

The melt flow C, being propelled by the reaction of the arc blast A-3, overcomes considerable gravitational resistance. In the ordinary flat position of a work piece such a wave flows upwards over an inclined plane. In the present case a great part of the wave flows horizontally along the path of least resistance afforded by the hot and liquefying walls C-2 etc. This preponderance of horizontal direction in the flow or wave C, due to the so-called horizontal welding position (that is, horizontal electrode travel along vertical plates) contributes to the danger that molten material may escape. Additionally of course, this danger is due to two basic factors: the fact that the crest C-5 of the wave C is projected out of the crater B, to a plane beyond the front surface of the plates 11; and the fact that the metal of the wave C is very fluid, mainly in those partial zones where it is still mixed with liquid flux. For these reasons the metal tends to flow down over this front surface in the form of drippings C-6, instead of forming a proper weld bead.

Such drippings are effectively prevented by the new process. To a large extent this is achieved by the metal-constraining effect of the flux or slag mold undisturbedly maintained around the molten metal.

The fusing, that is, melting and coalescing of the flux takes place particularly at the leading side of the arc column A. It results in the presence of a layer of more or less coalesced flux, covering the entire welding zone. The incandescent electrode tip is surrounded by such fused or fusing flux D-1 and the hot arc column A is surrounded by such fused or fusing flux D-2. Further there is molten, coalescing flux D-3 emerging from the melt flow C, due to the ejection of particles B-4. These flux bodies D-1, D-2, D-3 may not be entirely contiguous and uninterrupted everywhere, but are fused into a substantially contiguous, although not necessarily solid body, at some distance from the hottest portions D-1, D-2, where they form the well-known slag cover D-4, protecting the hot metal from contact with air. Practically the entire mass of coalesced and freezing metal C-5 is so protected.

The metallurgical and chemical advantages of such protection are well known to the art. In the present process, additional physical advantages are derived from the fused slag cover D, and mainly from parts of the fused and solidifying part D-4 of this cover. It must be understood that an admixture of small liquid flux particles makes a metal melt material more fluid— which indeed is one of the essential functions of any flux—but that the segregated, fused and solidifying cover D in effect makes the contacting body of molten metal less fluid than such body alone would be; also less fluid than such body would be if contacted only by granular or powdered material, not fused by the welding process. This cover has a relatively hot, fluid inner layer D-5 directly contacting the freezing but still liquid metal C-5 and probably at least as fluid as that metal. It also has a relatively cool, viscous outer layer D-6, rapidly freezing due to the relatively high melting point of the flux material. This rapidly freezing skin layer D-6 adds to the effective surface tension of the composite body of flux-metal melt C-5, D-5 which is in danger of gravitational escape. However the skin layer D-6 has this effect only when being kept undisturbed, by the support mechanism 34, 35, 38 for the adjacent, powdered or granular flux particles.

The metal-constraining effect of the flux support and flux mold is further aided by the aforementioned use of certain specific sizes of electrodes. Mainly when the two welding arcs, on the two sides of the shell, are close enough together to provide substantial mutual preheating of the base metal it is possible with the small electrodes mentioned, and with high-density welding currents, to provide such joint penetration as to allow very rapid traversing speeds, like 25 to 60 inches per minute on the plate material as described. Such high traversing speed is, by itself, a feature of great advantage because it accelerates the process as a whole; moreover it aids the production of an efficient seam, because it reduces the time interval during which any one portion C-5 of the metal melt is exposed to a substantial moment of the force of gravity. It might also be said that this routine tends to keep the melt and seam confined between juxtaposed, solid plate edges; it reduces the lateral projection of the bead in front of the plate.

As a summary of the foregoing explanations it may be noted that the new process relies on (1) the mechanism 34, 35, 38 which keeps the loose flux particles undisturbed by gravity; (2) the skin layer D-6 of the slag cover D, the surface tension of which aids in the production of a kind of mold for the liquid metal; and (3) preferably a high traversing speed, as explained.

The basic process described derives no aid, or at least no appreciable aid, from (4) lateral pressure of solid, discrete flux particles in the layer 19. Any attempt to exert lateral pressure on this layer by the flexible belt would result in warping and other movements of the working edge of the belt, along the shell, and consequent loss of the important vertical support provided by this belt. Even if the flux support belt be kept flat and some other means be used to bring the flux particles into progressive contact with or lateral pressure against the welding zone, caution is indicated, since it is desirable to allow the escape, at F, of the gas bubbles B-5 which were entrained by the flows A and C and which must be ejected from the metal melt. Added resistance to their travel by confinement or compression of the flux layer can prove detrimental. Thus it is important that the present flux support 34, 35 is vertically rigid and restrained against vertical movement and that the flux bed 19 is open and at least partly unconstrained.

The present welding zone differs greatly from that which is formed in the usual manual welding of horizontal seams in vertical stationary tank shells. The difference is largely due to the fact that an arc submerged in a layer of flux is used herein, while the usual manual routine must be performed with flux-coated electrodes, that is, in flux surroundings to be created by, not prearranged for the arc column. Furthermore differences as to type of electrodes etc. have been mentioned above. In the manual routine it is usual and necessary to deposit multiple string beads successively from each side of the shell. This applies not only in cases where the heating up of the base metal must be controlled to the greatest extent possible but even in the numerous cases where such time-consuming procedure is required only by the fact that larger masses of melt could not be kept from dripping away. According to the present method the horizontal seam can usually be formed, in the same shell, with a single bead deposited from each side; sometimes even with a single bead deposited from one side, penetrating most or all of the wall (involving in the latter event the use of an electrode 16 and flux layer 19 on one side and of a mere backing flux layer 19 on the other side). Moreover, the manual depositing of successive beads causes high welding stresses, which can be reduced only by expensive routines like a wandering sequence. The present seam-forming method, with fewer coextensive beads, reduces the welding stresses materially. Generally speaking, the present method extends, for the first time so far as I know, the advantages of submerged arc-welding to the joining of seams in horizontal position, in the construction of tank shells and the like.

The present welding zone differs from the welding zone of earlier submerged arc processes. This applies not only due to the different size of electrodes used, as noted above. It applies mainly due to the different thermal, gravitational and related features. The shape of the slag-metal interface, and resulting shape of the bead, may be approximately the same herein as in comparable seams produced in flat position; however, the support for and resulting internal stresses of the two types of slag envelopes are quite different.

I have shown two electrodes and flux support structures of similar design, partly opposite one another (Figs. 2, 3), to deposit a welding seam consisting in two string beads with mutually opposed roots. Numerous modifications are possible in this respect. Some of these have been mentioned above; and upon consideration hereof and of the prior art alluded to, other modifications will occur to persons skilled in the art, as to the procedural details and the different horizontal seams and tank shell structures produced thereby. The details depend largely on the requirements imposed on the tank shell, as to resistance to hydraulic and mechanical stresses, high or low temperatures, corrosive attack etc., which may call for different types of metallurgical microstructure, welding stress control, etc. These interrelated matters are complicated but well understood at least for a number of plate materials available for tank shells.

Accordingly, the horizontal seams B-6 in tank walls 11 formed hereunder may differ as to bead arrangement and the like, but they are basically characterised by two features distinguishing them from the usual, manually formed seams, in stationary vertical curved shells. One of the features is that such as seam B-6 is composed of longitudinally substantially homogeneous string beads, produced by the automatic feed and deposition of an electrode wire unrolled from a large reel; not by the use of manually held, necessarily short electrodes with frequent start and end points and resulting areas of irregular bead structure, weld stress and microstructure. The other pertinent feature is that each string bead of seam B-6 penetrates at least one half of the thickness of the plates 11 to be joined; not only one quarter or less, as in the manual routine. Of course the weld beads and seams contemplated herein are made of alloy steel or other metal alloy suitably selected to match the base metal.

Both features mentioned contribute significantly to the overall economy and efficiency balance of the shell and of the complete, field-erected tank or other structure. Both of them are made possible by the submerged arc welding along a vertical surface, which in turn is made possible by the novel flux trough, mold and related features as described.

No doubt various modifications will occur to persons skilled in the pertinent arts, upon consideration of this disclosure.

I claim.

1. Welding process for use on an upstanding shell, comprising the steps of movably holding the ends of a deformable, substantially longitudinally extended strip to the ends of a horizontal area of the shell; deforming an intermediate portion of the so extended strip toward the shell to press said portion to the shell regardless of horizontal curvature and irregularities in the shell; pouring onto said portion a layer of flux contacting the shell; and horizontally traversing the shell with a welding arc submerged under the flux.

2. Welding process for use on an upstanding shell, comprising the steps of movably holding the ends of a flexible, substantially longitudinally extended strip to the ends of a horizontal area on the shell; resiliently flexing an intermediate portion of the so extended strip toward the shell to press said portion tightly to the shell regardless of horizontal curvature and irregularities in the shell; pouring onto said portion a layer of flux contacting the shell; and horizontally traversing the shell with a welding arc submerged under the flux.

3. Welding process for use on an upstanding shell, comprising the steps of temporarily holding the ends of a flexible, substantially longitudinally extended strip to the ends of a horizontal area of the shell; flexing an intermediate portion of the so extended strip toward the shell, beyond the position of the strip that is due to such holding, to press said portion tightly against the shell regardless of horizontal curvature and irregularities in the shell; pouring onto said portion a layer of flux contacting the shell; and horizontally traversing the shell with a welding arc submerged under the flux.

4. Welding process as described in claim 3 wherein the strip is substantially flat, extended in a substantially flat plane, and flexed substantially in said plane.

5. Welding process for use on an upstanding shell, comprising the steps of maintaining a run of an endless flexible belt substantially longitudinally extended; momentarily holding the ends of said run to the ends of a horizontal area on the shell; flexing an intermediate portion of said run toward the shell to press said portion tightly against the shell regardless of horizontal curvature and irregularities in the shell; pouring onto said portion a layer of flux contacting the shell; horizontally traversing the shell with a welding arc submerged under the flux; and continuously moving the endless belt horizontally along the shell.

6. Welding process as described in claim 5 wherein, incident to said moving of the belt and pressing of said run, said run is temporarily held in substantially stationary contact with the shell.

7. Welding apparatus for use on an upstanding shell, comprising an endless belt; means for temporarily maintaining a run of said belt substantially longitudinally extended along a horizontal area of the shell and for holding the ends of said run to the ends of said area; yielding means for flexing an intermediate portion of said run toward the shell to press said portion tightly against the shell regardless of horizontal curvature and irregularity in the shell; means for feeding flux and welding wire toward the shell directly above said portion; and a mechanism for moving said several means horizontally along the shell.

8. Welding apparatus as described in claim 7, wherein said means for holding and flexing a run of the belt comprises a pair of end pulleys horizontally spaced from one another to hold said run extended, and a mechanism interposed between said end pulleys for flexing said intermediate portion.

9. Welding apparatus as described in claim 8, wherein said mechanism comprises pressure roller means engaging an edge of the belt and biased toward the shell.

10. Welding apparatus as described in claim 9, wherein said pressure roller means comprises a set of rollers having axes in substantially upright planes and said end pulleys have axes in a single, substantially flat plane.

11. Welding apparatus as described in claim 10, comprising means to press upper peripheral edge parts of the end pulleys against the shell, and means on peripheral surface parts of the end pulleys to derive traction for the belt.

12. Welding apparatus as described in claim 10, additionally comprising a flat, rigid tray mounted between and horizontally movable with said end pulleys, to prevent said extended run from sagging under the weight of the flux poured thereon, said belt being substantially flat and said belt run being extended in a flat plane directly above the tray.

AMEL R. MEYER.

References Cited in the file of this patent

UNITED STATES PATENTS

| Number | Name | Date |
|---|---|---|
| 1,966,244 | Hansen | July 10, 1934 |
| 2,071,246 | Allen | Feb. 16, 1937 |
| 2,294,439 | Bagley | Sept. 1, 1942 |
| 2,337,049 | Jackson | Oct. 21, 1943 |
| 2,395,723 | Chmielewski | Feb. 26, 1946 |
| 2,529,812 | Peters | Nov. 14, 1950 |